United States Patent
Santelli, Jr.

(10) Patent No.: US 11,522,351 B2
(45) Date of Patent: Dec. 6, 2022

(54) WIRE MANAGEMENT SYSTEM AND KIT

(71) Applicant: Albert Santelli, Jr., Martinsville, NJ (US)

(72) Inventor: Albert Santelli, Jr., Martinsville, NJ (US)

( * ) Notice: Subject to any disclaimer, the term of this patent is extended or adjusted under 35 U.S.C. 154(b) by 196 days.

(21) Appl. No.: 16/870,778

(22) Filed: May 8, 2020

(65) Prior Publication Data

US 2020/0343701 A1    Oct. 29, 2020

Related U.S. Application Data

(63) Continuation-in-part of application No. 16/819,302, filed on Mar. 16, 2020.

(60) Provisional application No. 62/844,853, filed on May 8, 2019, provisional application No. 62/818,795, filed on Mar. 15, 2019.

(51) Int. Cl.
- *H02G 3/06* (2006.01)
- *H02G 3/04* (2006.01)
- *F16L 3/10* (2006.01)

(52) U.S. Cl.
CPC .......... *H02G 3/0418* (2013.01); *F16L 3/1058* (2013.01); *H02G 3/0456* (2013.01); *H02G 3/06* (2013.01)

(58) Field of Classification Search
CPC ...... H02G 3/0418; H02G 3/0456; H02G 3/06; F16L 3/1058
USPC ........................................................ 138/177
See application file for complete search history.

(56) References Cited

U.S. PATENT DOCUMENTS

| | | | | |
|---|---|---|---|---|
| 4,454,374 A | * | 6/1984 | Pollack | H02G 3/0431 174/117 A |
| 4,530,865 A | ‡ | 7/1985 | Sprenger | E04F 19/04 174/95 |
| 4,937,400 A | ‡ | 6/1990 | Williams | H02G 3/266 174/95 |
| 4,942,271 A | * | 7/1990 | Corsi | H02G 3/0418 174/101 |
| 5,235,136 A | * | 8/1993 | Santucci | H02G 3/0437 174/101 |
| 5,668,351 A | ‡ | 9/1997 | Hanlon | B60R 16/0215 174/72 A |
| 6,084,180 A | * | 7/2000 | DeBartolo, Jr | H02G 3/0418 174/101 |
| 6,283,247 B1 | * | 9/2001 | McGrath | B44C 7/022 181/295 |
| 6,284,975 B1 | * | 9/2001 | McCord | G02B 6/4459 174/71 R |
| 6,333,461 B1 | * | 12/2001 | Marcou | H02G 3/0418 174/68.3 |
| 6,380,484 B1 | * | 4/2002 | Theis | F16L 3/26 174/101 |
| 6,756,539 B1 | * | 6/2004 | VanderVelde | H02G 3/0608 52/36.2 |

(Continued)

*Primary Examiner* — Timothy J Thompson
*Assistant Examiner* — Michael F McAllister
(74) *Attorney, Agent, or Firm* — Porzio Bromberg & Newman P.C.

(57) ABSTRACT

A wire management system including a cord cover. A kit of the wire management system can include a plurality of cord covers having various sizes or shapes to enable arrangement over cords or cables of various lengths without having to cut the cord covers to particular sizes. Various connectors can be used to cover or couple adjacent cord covers.

17 Claims, 18 Drawing Sheets

(56) References Cited

U.S. PATENT DOCUMENTS

| | | | | |
|---|---|---|---|---|
| 6,903,265 | B1 * | 6/2005 | VanderVelde | H02G 3/0418 |
| | | | | 174/68.3 |
| 7,075,010 | B2 * | 7/2006 | Santelli, Jr. | H02G 3/0418 |
| | | | | 174/71 R |
| 8,729,408 | B2 ‡ | 5/2014 | Pawlak | E04F 19/04 |
| | | | | 248/68.1 |
| 2006/0185883 | A1 * | 8/2006 | Santelli, Jr. | H02G 3/00 |
| | | | | 174/72 A |
| 2007/0138349 | A1 ‡ | 6/2007 | Ayoub | F16L 3/26 |
| | | | | 248/58 |
| 2007/0297743 | A1 * | 12/2007 | Rapp | H02G 3/0608 |
| | | | | 385/134 |

\* cited by examiner

‡ imported from a related application

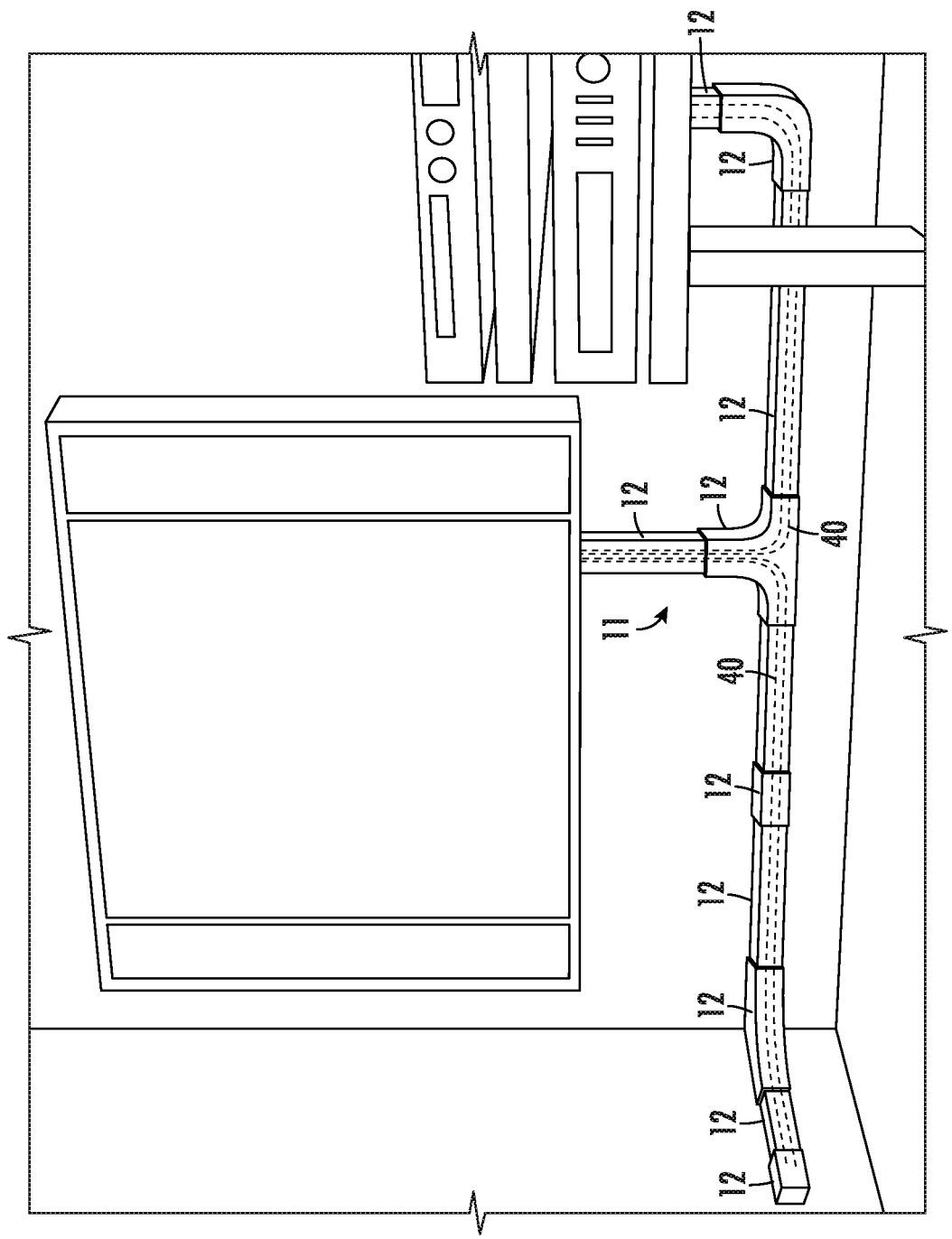

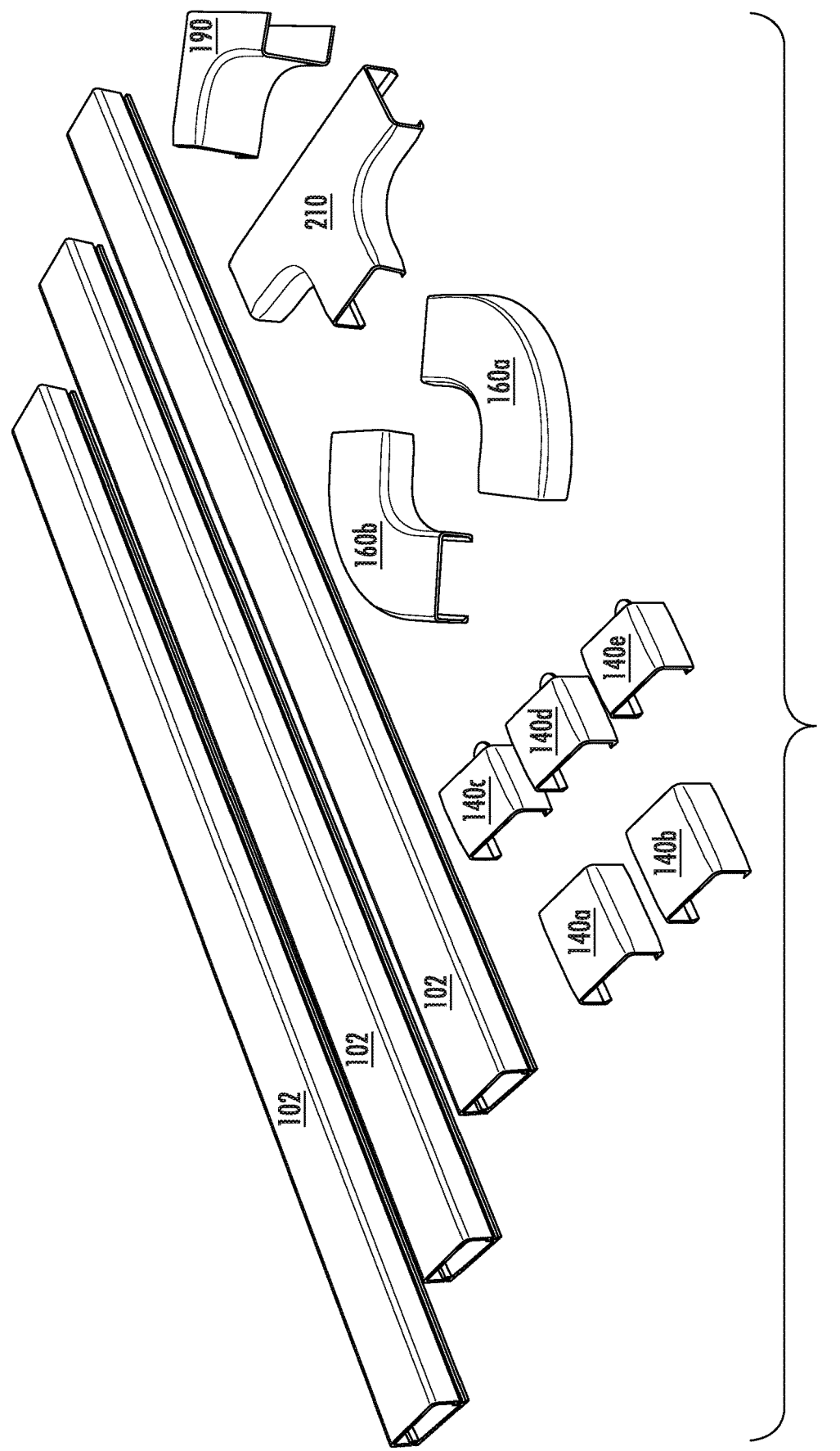

WIRE MANAGEMENT SYSTEM AND KIT

BACKGROUND OF THE INVENTION

Field of the Invention

The present invention in general to an electric wire holder for hiding wire and in particular to a wire management system including a kit of a plurality of wire covers of various sizes and one or more connectors.

Description of Related Art

It is known that electrical the cords of domestic appliances such as clocks and lamps are unsightly and generally hang or run loosely from the appliances to the electrical outlets in a room. U.S. Pat. No. 4,454,374 describes an electric cord holder, which includes a sheath made of an elongated plastic extrusion having a slotted-tubular cross-section so as to define a cord-receiving channel therein. The sheath has a dome-shaped front wall having two ends and a planar rear wall joined to one end of the front wall and extending from the one end of the front wall towards the other end of the front wall. The rear wall has a free end leaving a slot adapted for insertion of an electrical cord into the cord-receiving channel between the free end of the rear wall and the other end of the front wall. The rear wall has an inner face which partially defines the cord-receiving channel and an outer face. The front wall has an overhang depending from the other end thereof which extends beyond the outer face and at least slightly toward the free end of the rear wall. The holder further includes securing means a connected to the outer face of the rear wall and adapted to be attached to an external surface, whereby the electric cord holder may be attached to the external surface with the overhang substantially abutting the external surface.

It is desirable to provide an improved wire management system including a kit of a plurality of cord covers having various sizes to enable arrangement over cords of various lengths without having to cut the cord covers to particular sizes.

SUMMARY OF THE INVENTION

The present invention relates to a wire management system including a cord cover. A kit of the wire management system can include a plurality of cord covers having various sizes or shapes to enable arrangement over cords or cables of various lengths without having to cut the cord covers to particular sizes. The kit can include one or more connectors for joining or covering ends of adjacent cord covers. In one embodiment, the connector joins adjacent cord covers at an angle to each other for use in a corner. For example, the kit can include a plurality of cord covers having small lengths for ease of installation by persons of lesser mechanical abilities. In one embodiment, a micro-management kit includes one or more cord covers having a streamlined shape and a size to receive thin cords such as from home smart speakers. The cord cover includes an adhesive strip which provides permanent adhesion on a side attached to the cord cover. An opposite side of the adhesive strip provides removable adhesion to a surface to which the cover is adhered for allowing the cord cover to be re-positioned or re-used without damaging the surface.

The cord cover can be formed of a rigid material, such as for example rigid plastic. In one embodiment, the cord cover includes a front wall coupled or integral with two side walls. The front wall can have an arc or curved shape. One of the side walls is coupled or integral to a rear wall. The width of the rear wall can be less than the width of the front wall to form an opening between the rear wall and the opposed side wall. A cavity is formed between the front wall, side walls and rear wall. An adhesive material or adhesive strip is attached to an outer surface of the rear wall. The cord cover can have a streamlined shape of an curve or arc. The opening and the cavity can be slightly larger than a received cord. An adhesive liner is placed over the adhesive material or adhesive strip. The cord cover can be formed of a plastic with a non-metallic surface. The outer surface of the cord cover can be painted if desired.

In an alternate embodiment, the cord cover includes a front wall coupled or integral with two side walls. A flexible entry tab is formed at an end of one of the side walls. An end of the other of the side walls is coupled or integral to a rear wall. The front wall and rear wall can be parallel to one another and perpendicular to the side walls. The width of the rear wall can be less than the width of the front wall to form an opening between the rear wall and the opposed side wall. A cavity is formed between the front wall, side walls and rear wall. An adhesive material or adhesive strip is attached to an outer surface of the rear wall. An adhesive liner is placed over the adhesive material or adhesive strip.

During use, a lay out of the plurality of cord covers is determined from the arrangement of cord or cords to be covered. The cord or cords to be covered can be received within respective cord covers. The adhesive liner is removed and the adhesive material or adhesive strip is applied to a surface over which a cord or cable is desired to extend. The surface can be a wall. In one method, a portion of the adhesive liner can be peeled back on each end of the cord cover and the cord cover can be placed in position to check alignment. Once the correct position is determined the remainder of the adhesive liner can be removed.

In an alternate embodiment, the adhesive liner is removed and the adhesive material or adhesive strip is applied to a surface over which a cord or cable is desired to extend. The flexible entry tab can be flexed to allow the cord or cable to be inserted through the opening between the rear wall into the cavity of the cord cover. The cord or cable can be removed from the cavity upon flexing the flexible entry tab and removing the cord or cable from the cavity. This embodiment allows cords or cables to be expeditiously replaced after attachment of the wire management system to the surface.

The kit of the wire management system can be packaged with a plurality of short length sections of cord covers for ease of consumer carry out purchases. The plurality of cord covers can have pre-determined length to control a retail package size to accommodate retail shelf and or wall space. The kit of the wire management system can be used in a do it yourself consumer application for their homes and offices. The kit of the wire management system can be used for application of the cord covers at pre-determined positions without using tools.

The invention will be more fully described by reference to the following drawings.

BRIEF DESCRIPTION OF THE DRAWINGS

FIG. 1B is a perspective view of a kit of a plurality of wire management systems including a cord cover during use in a in a flat screen environment.

FIG. 16 is a schematic diagram of an example kit.

DETAILED DESCRIPTION

Figure 1A:
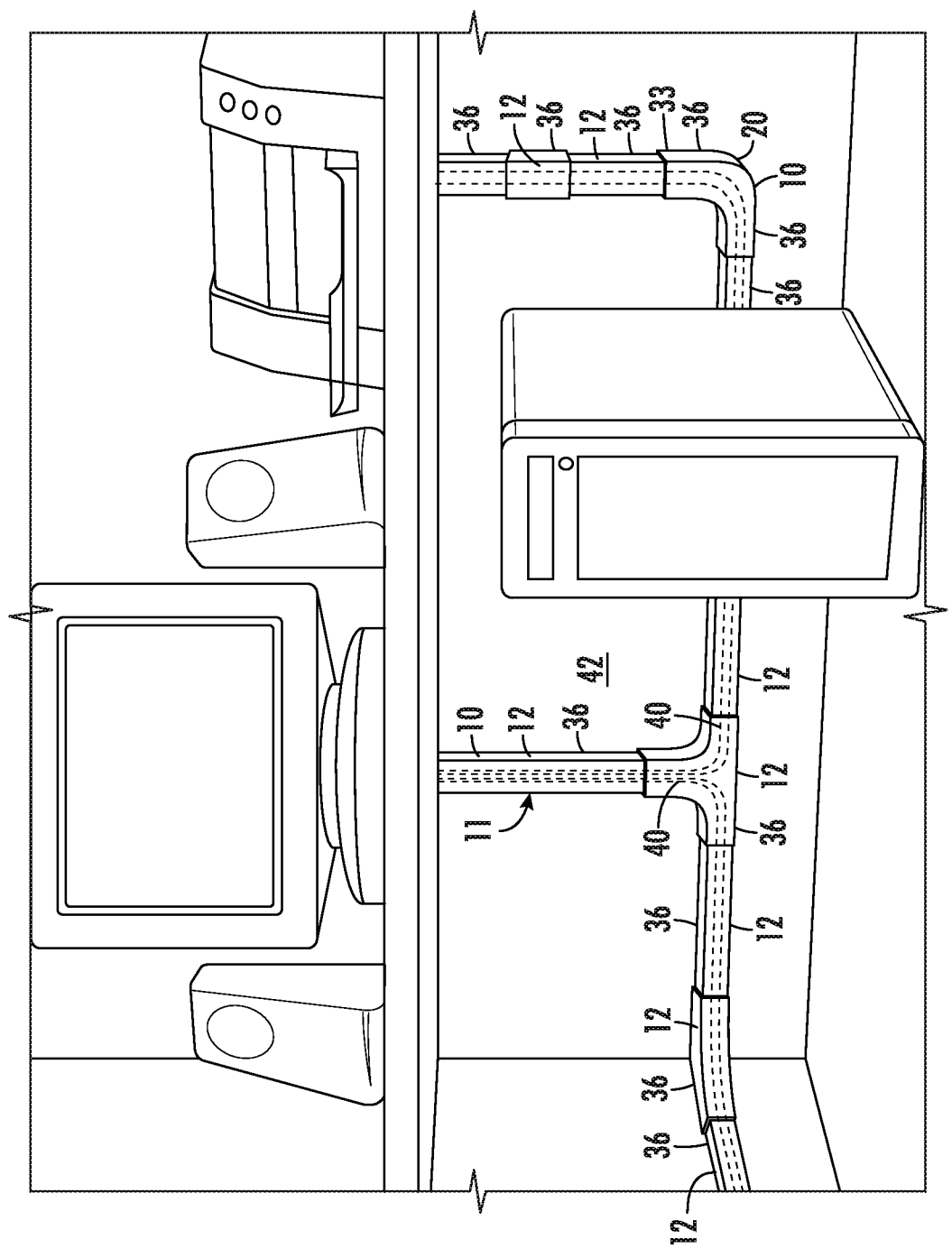
FIG. 1A is a perspective view of a kit of a plurality of wire management systems including a cord cover during use in a computer system environment.

Reference will now be made in greater detail to a preferred embodiment of the invention, an example of which is illustrated in the accompanying drawings. Wherever possible, the same reference numerals will be used throughout the drawings and the description to refer to the same or like parts.

FIGS. 1A and 1B are perspective views of a kit 11 of a plurality of wire management systems 10. Each wire management system 10 has a predetermined size. For example each wire management system 10 can be defined as having a small size about 2 to about 4 inches, a medium size about 4 to about 12 inches or a large size about 12 to about 24 inches. It will be appreciated that this description is only an example and various sizes of wire management system 10 can be defined in accordance with the teachings of the present invention. One or more of each of the predetermined sizes of wire management system 10 can be included within kit 11.

Figure 2:
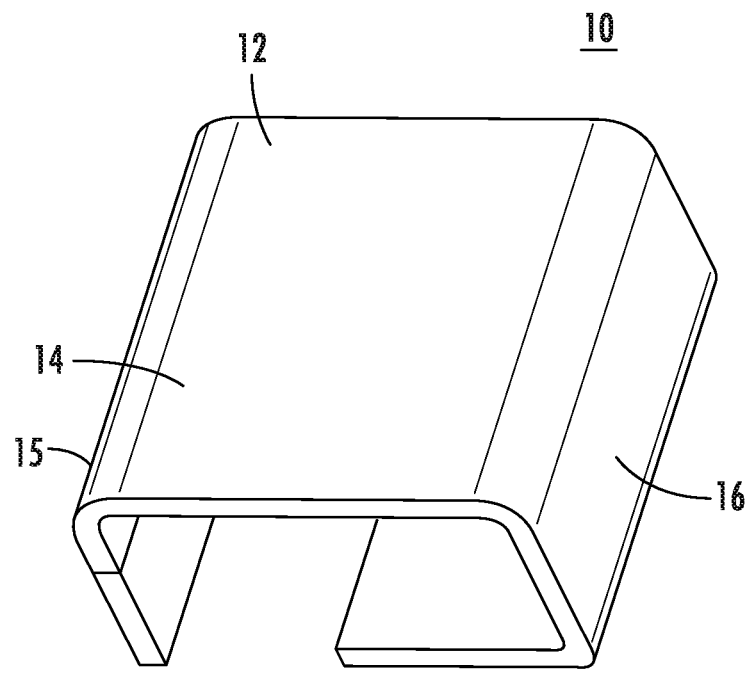
FIG. 2 is a perspective view of an embodiment of the wire management system.
Figure 3:
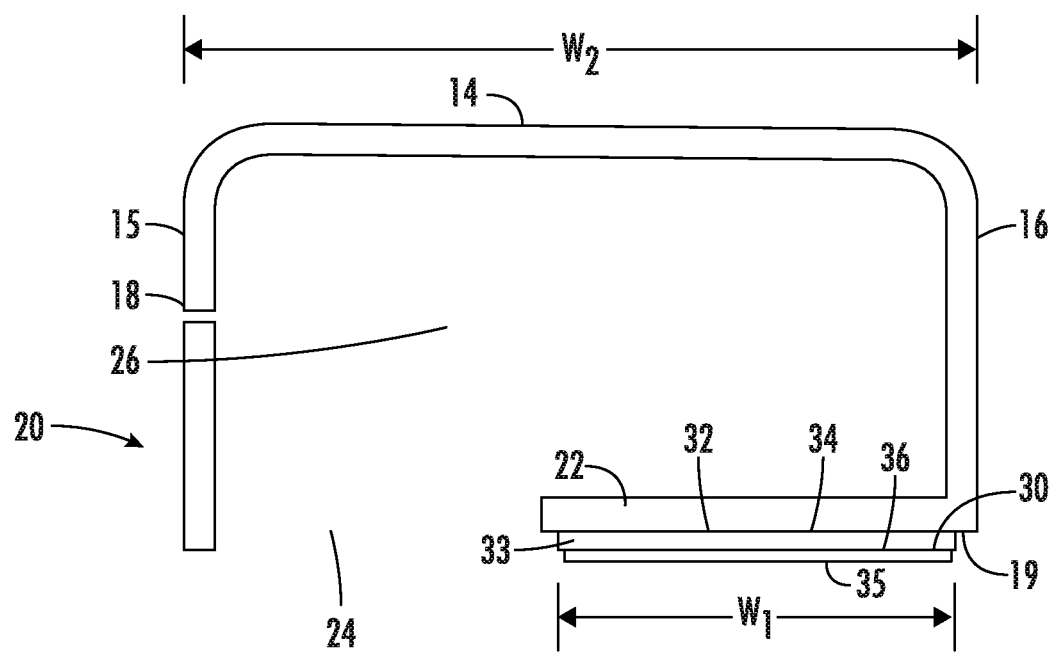
FIG. 3 is a front view of the embodiment shown in FIG. 2.

Each wire management system 10 includes a cord cover. In one embodiment as shown in FIGS. 2 and 3, cord cover 12 includes front wall 14 coupled or integral with side wall 15 and side wall 16. End 19 of side wall 16 is coupled or integral to rear wall 22. Width W1 of rear wall 22 can be less than width W2 of front wall 14 to form opening 24 between rear wall 22 and side wall 15. Cavity 26 is formed between front wall 14, side wall 15, side wall 16 and rear wall 22. Front wall 14 and rear wall 22 can be parallel to one another and perpendicular to side wall 15 and side wall 16. For example, W1 can be in the range of about 0.5 to about 2 inches, about 0.75 to about 1.5 inches and about 1.0 to about 1.25 inches.

End 18 of side wall 15 includes flexible entry tab 20, as shown in FIG. 3. End 19 of side wall 16 is coupled or integral to rear wall 22. Width W1 of rear wall 22 can be less than width W2 of front wall 14 to form opening 24 between rear wall 22 and side wall 15. Cavity 26 is formed between front wall 14, side wall 15, side wall 16 and rear wall 22.

Adhesive material 30 is attached or coated on outer surface 32 of rear wall 22. In one embodiment, adhesive material 30 is a pressure sensitive adhesive strip 33. Side 34 of pressure sensitive adhesive strip 33 is attached to outer surface 32 of rear wall 22. Side 34 can be permanently attached to outer surface 32. Adhesive liner 35 is placed over adhesive strip 33. Adhesive liner 35 is removably attached to side 36 or adhesive strip 33.

Figure 4:
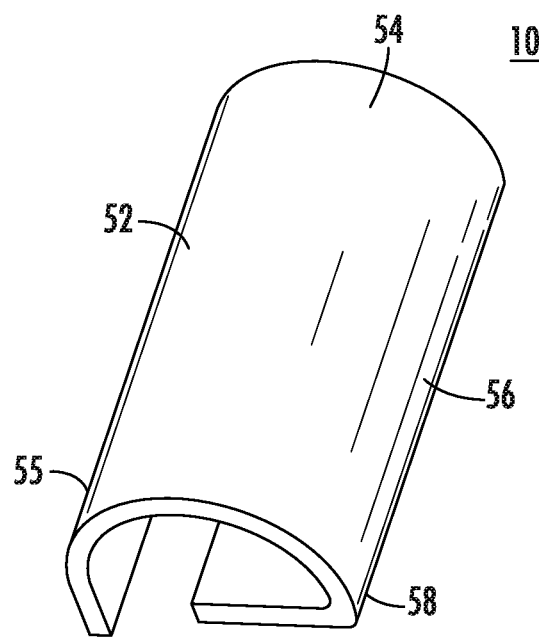
FIG. 4 is a perspective view of an alternate embodiment of the wire management system.
Figure 5:
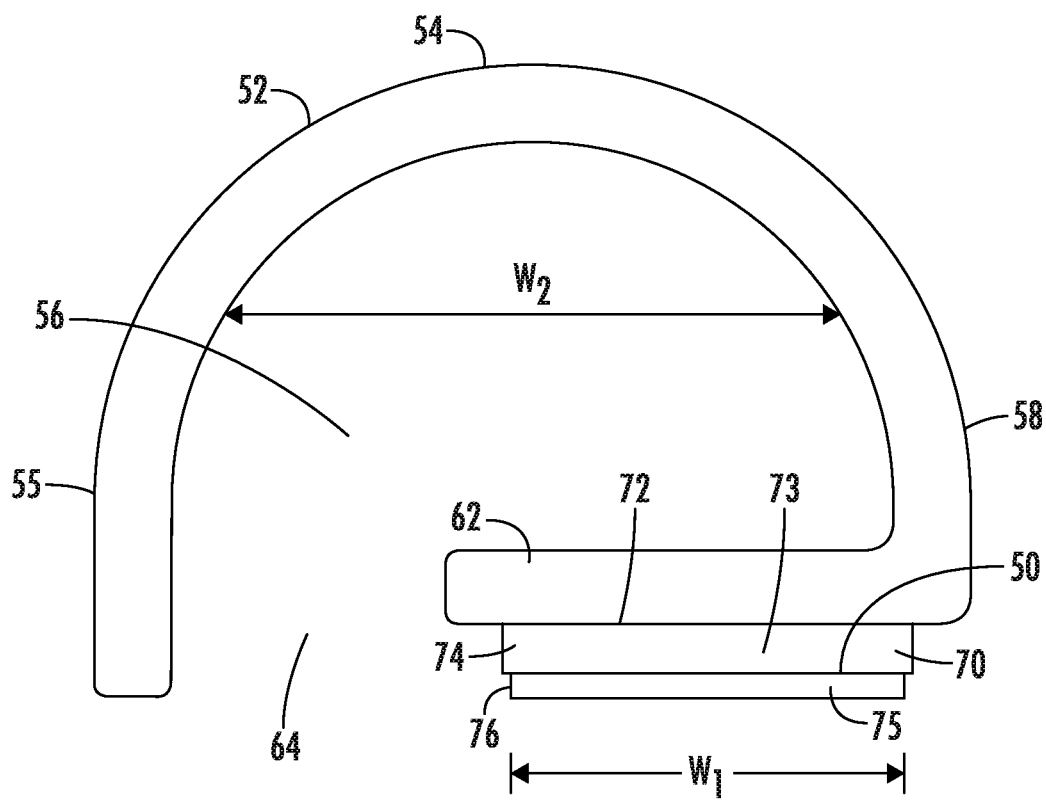
FIG. 5 is a front view of the embodiment shown in FIG. 4.
Figure 7:
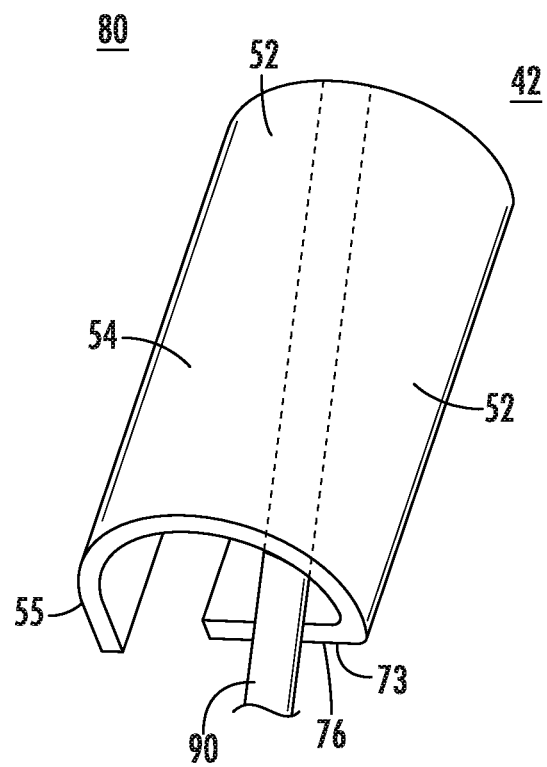
FIG. 7 is a schematic diagram of the wire management system shown in FIG. 4 during use with a received cord.

In an alternate embodiment, cover 52 can include front wall 54 having an arc or curved shape as shown in FIGS. 4 and 5. Front wall 54 is coupled or integral with side wall 55 and side wall 56. End 59 of side wall 56 is coupled or integral to rear wall 62. Width W1 of rear wall 62 can be less than width W2 of front wall 54 to form opening 64 between rear wall 62 and side wall 65. Cavity 66 is formed between front wall 54, side wall 55, side wall 56 and rear wall 62. Width W1 of rear wall 62 can be less than width W2 of front wall 54 to form opening 64 between rear wall 62 and side wall 55. Cover 52 can have a streamlined shape. Opening 64 and cavity 66 can be slightly larger than a received cord as shown in FIG. 7.

Cord cover 12 and cord cover 52 can be formed of a rigid material or semi-rigid material Adhesive strip 70 is coupled to cover 52. Side 74 of adhesive strip 70 is coated with an adhesive which provides permanent adhesion to outer surface 72 of rear wall 62. In one embodiment, adhesive strip 70 is a pressure sensitive adhesive strip 73. An example of an adhesive which provides permanent adhesion is 3M foam tape #4462. Side 74 can be permanently attached to outer surface 72. Side 76 adhesive strip 70 is coated with an adhesive which provides removable adhesion to a surface. An example of an adhesive which provides removable adhesion is Duraco REMO ONE foam tape Adhesive liner 75 is placed over side 76 of adhesive strip 73. Adhesive liner 75 is removably attached to side 76 or adhesive strip 73. For example cord cover 12 and cord cover 52 can be formed of rigid polyvinyl chloride (PVC). Flexible entry tab 20 can be formed of a flexible material. For example, flexible entry tab 20 can be formed of flexible PVC or urethane. In one embodiment, cord cover 12 and flexible entry tab 20 are co-extruded.

Figure 6:
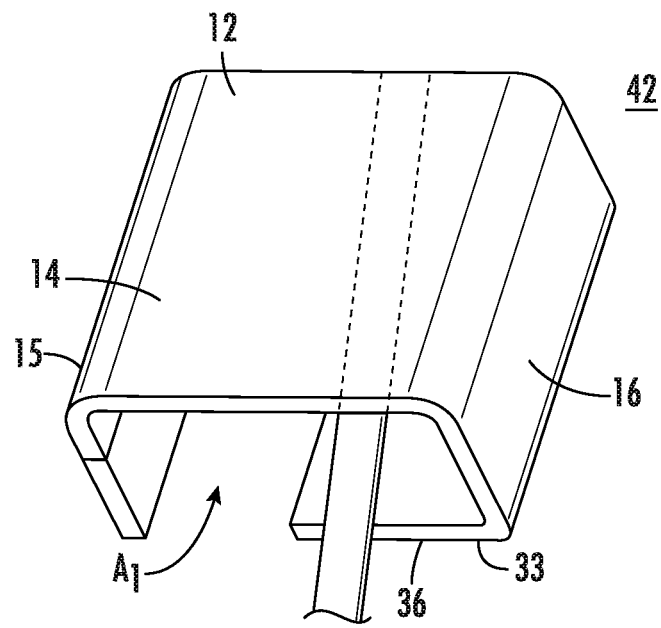
FIG. 6 is a schematic diagram of the wire management system shown in FIG. 2 during use with a received cord.

Cord cover 12 can be formed in various lengths to be used to cover various arrangements of cords 40 from various electronic products as shown in FIG. 1A and FIG. 1B. For example, cord cover 12 can be used with electronic audio or video applications. Example electronic products that can be included in the audio or video applications can include for example, computers, hard drives, printers, monitors, televisions, DVD players and the like. For example, cord 40 can be an electrical cord or a cable. During use, adhesive liner 35, shown in FIG. 6, is removed and side 36 of adhesive strip 33 is applied to surface 42 in an arrangement to place one or more cord covers 12 over cords 40 as shown in FIGS. 1A and 1B. For example, surface 42 can be a wall.

Flexible entry tab 20 can be flexed to allow cord 40 to be inserted through opening 24 into cavity 26, as shown in FIG. 6. Cord 40 can be retained within cavity 26. Cord 40 can be removed from cavity 26 upon flexing flexible entry tab 20 and removing cord 40 from cavity 26. After removal of cord 40, side 36 can be removed from surface 42.

Figure 8:
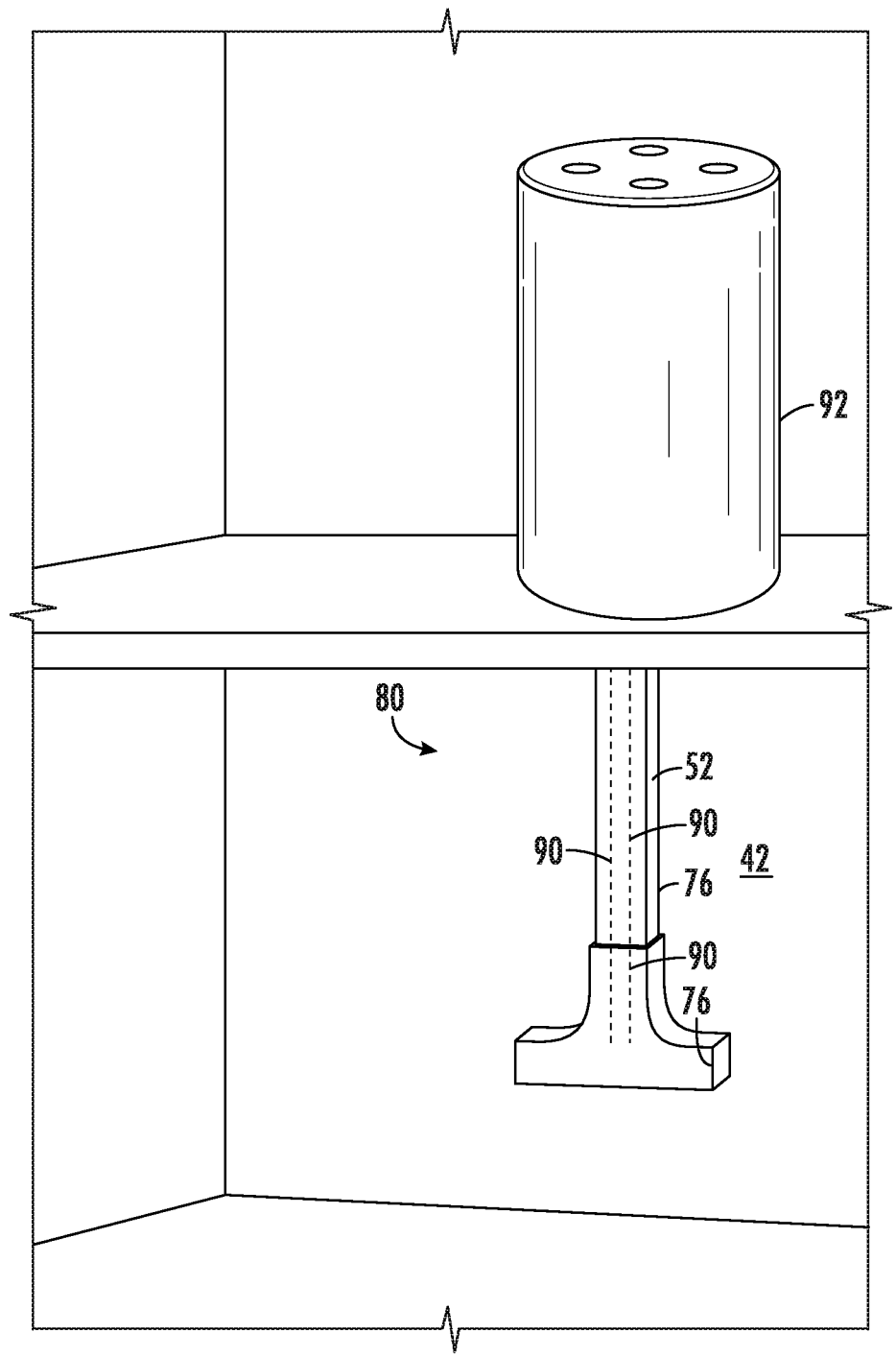
FIG. 8 is a schematic diagram of a micro-management system during use with a home smart speaker.

FIG. 8 illustrates micro-management kit 80. Micro-management kit 80 includes one or more of cord covers 52. During use, adhesive liner 75, shown in FIG. 7, is removed and side 76 of adhesive strip 73 is applied to surface 42 in an arrangement to place one or more cord covers 52 over cords 90 of portable electronic device 92 as shown in FIG. 8. Side 76 of adhesive strip can be removed from surface 42 to allow cord cover 52 to be re-positioned to cover a re-positioned portable electronic device 92. For example, portable electronic device 92 can include a home smart speaker, such as for example Google Home or Amazon Echo.

Figure 9:
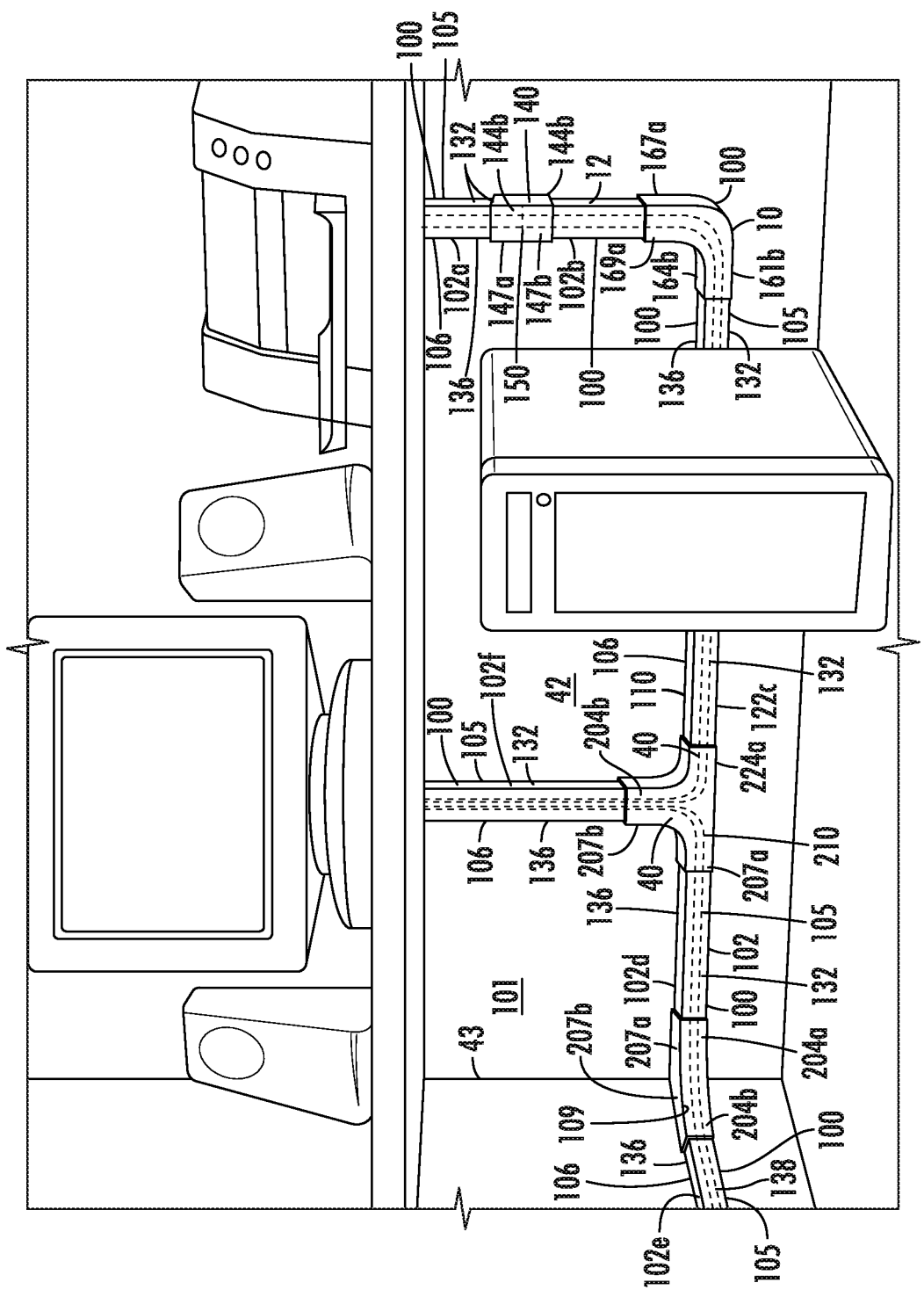
FIG. 9 is a perspective view of a kit of a plurality of wire management systems including a cord cover during use in a computer system environment.

FIG. 9 is a perspective views of wire management kit 101 of a plurality of wire management systems 100. Each wire management system 100 includes cord cover 102 of a predetermined size. For example each cord cover 102 in wire management system can have a pre-determined length and width to cover an arrangement of wire. Cord cover 102 can have ranges of lengths such as for example a small size about 2 to about 4 inches, a medium size about 4 to about 12 inches or a large size about 12 to about 24 inches. Each wire management system 100 can have a pre-determined width for example in the range of about 0.5 to about 4.5 inches, about 1 to about 4 inches and about 2.0 to about 3.0 inches. In one embodiment, cord cover 102 has a length of about 18 inches and a width of about one inch.

It will be appreciated that this description is only an example and various sizes of wire management system 100 can be defined in accordance with the teachings of the present invention. One or more of each of the predetermined sizes of wire management system 100 can be included within kit 101.

Figure 10A:
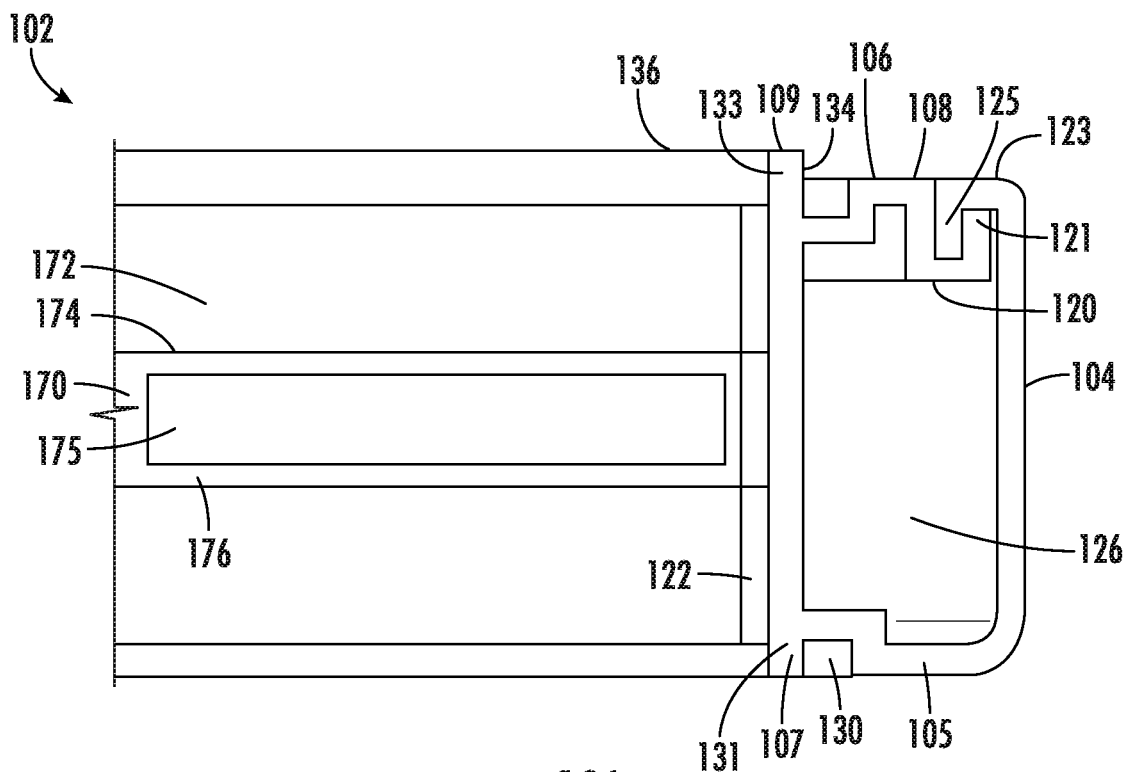
FIG. 10A is an end and rear view of an embodiment of a wire management system.
Figure 10B:
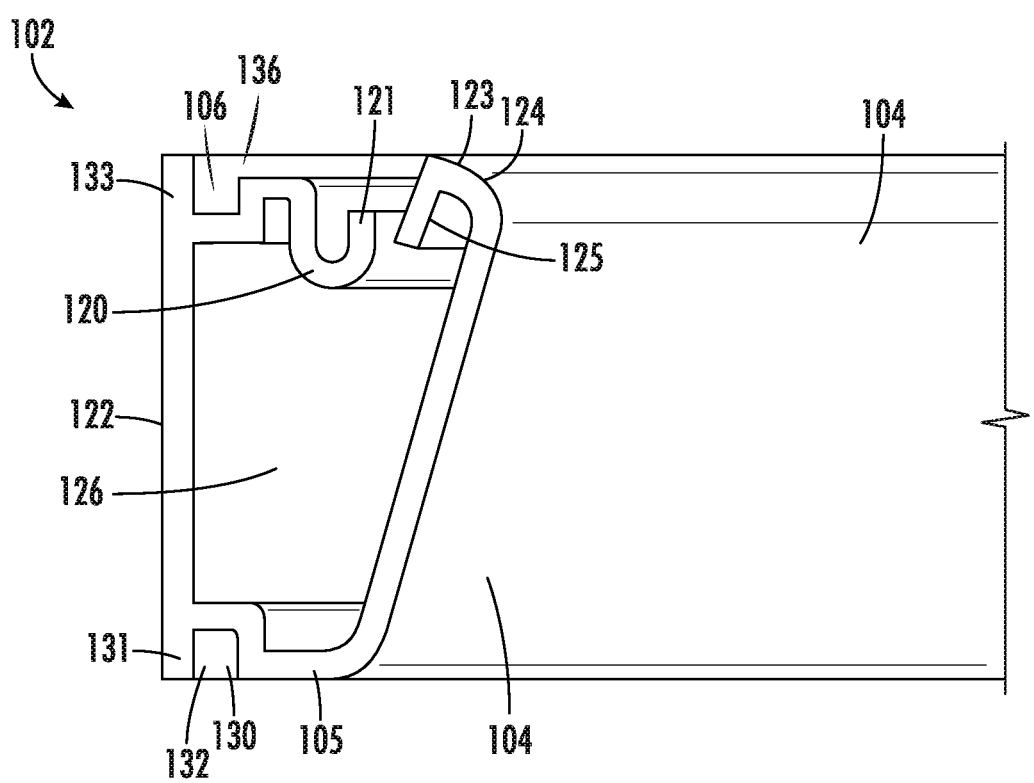
FIG. 10B is an end an front view of the embodiment of the wire management system shown in FIG. 10A.

In one embodiment as shown in FIGS. 10A and 10B, cord cover 102 includes front lid 104 coupled or integral with side wall 105. End 107 of side wall 105 is coupled or integral with rear wall 122. End 109 of side wall 106 is coupled or integral to rear wall 122. Flange 120 can be formed at end 118 of side wall 106. Flange 120 can be formed in a U-shape. Flange 120 can include lip 121 as shown in FIG. 10B.

Flange 123 can be formed at end 124 of front lid 104. Flange 123 can be formed in a U-shape. Flange 123 can include lip 125. Lip 125 of front lid 104 can engage lip 121 of side wall 106 to close cord cover 102 as shown in FIG. 10A.

Cavity 126 is formed between front lid 104, side wall 105, side wall 106 and rear wall 122 as shown in FIG. 10A. In the closed position, front lid 104 and rear wall 122 can be parallel to one another and perpendicular to side wall 105 and side wall 106. In an open position, lip 125 of front lid 104 is disengaged from lip 121 of side wall 106 as shown in FIG. 10B. Cord cover 102 can be formed of a flexible plastic material to allow lip 125 of front lid 104 to be disengaged from lip 121 of side wall 106 and to allow lip 125 of front lid 104 to be snapped into engagement with lip 121 of side wall 106. For example, front lid 104 and side walls 105 and 106 can be formed of a flexible material, such as flexible plastic or thermoplastic. Cord cover 102 can be formed of one or more materials including plastic, high density and low-density polyethylene, polyvinyl chloride (PVC), acrylonitrile butadiene styrene (ABS) and nylon materials. Cord cover 102 can be formed of a material which is impact resistant and provides a protective barrier to oils, acids, alkalis and grease and are UL 5A compliant. For example, the flexible plastic can be flexible polyvinyl chloride (PVC). Rear wall 122 can be formed of flexible plastic or rigid plastic. For example, rigid plastic can be formed of rigid polyvinyl chloride (PVC). Front lid 104, side walls 105 and 106 can be co-extruded with rear wall 122.

Flange 130 can be formed at end 107 of side wall 105. End 131 of flange 130 can coupled or integral with rear wall 122. Flange 130 can form indentation 132 along the length of side wall 105 adjacent rear wall 122. Flange 134 can be formed at end 109 of side wall 106. End 133 of flange 134 can be coupled or integral with rear wall 122. Flange 134 can form indentation 136 along the length of side wall 106 adjacent rear wall 122.

Adhesive strip 170 is coupled to rear wall 122 of cover 102. Side 174 of adhesive strip 170 is coated with an adhesive which provides permanent adhesion to outer surface 172 of rear wall 122. In one embodiment, adhesive strip 170 is a pressure sensitive adhesive strip. An example of an adhesive which provides permanent adhesion is 3M foam tape #4462. Side 174 can be permanently attached to outer surface 172. Side 176 adhesive strip 170 is coated with an adhesive which provides removable adhesion to a surface. An example of an adhesive which provides removable adhesion is Duraco REMO ONE foam tape. Adhesive liner 175 is placed over side 176 of adhesive strip 170. Adhesive liner 175 is removably attached to side 176 or adhesive strip 170.

Figure 11A:
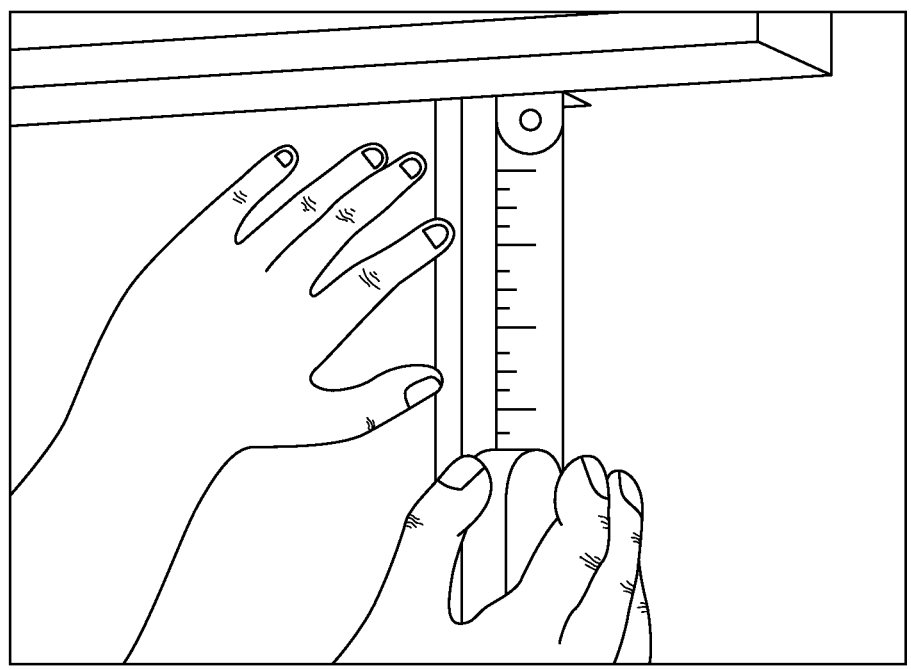
FIG. 11A is a schematic diagram during use of the wire management system of FIG. 10A in which a size is predetermined for the wire management system.
Figure 11B:
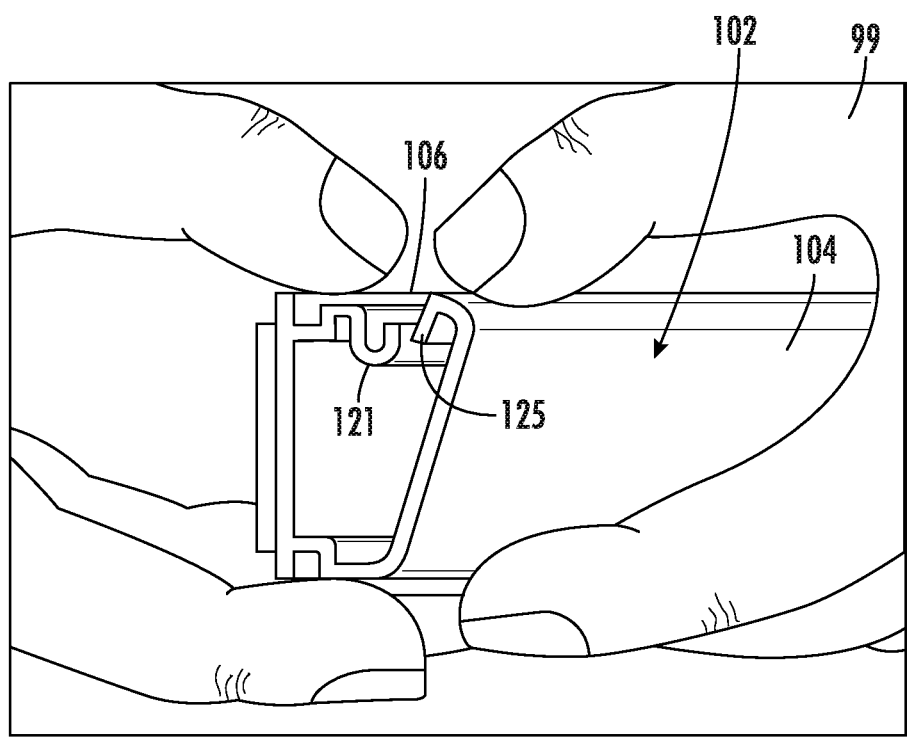
FIG. 11B is a schematic diagram during use of the wire management system of FIG. 10A in which a side wall is pressed to release the front wall of the wire management system.
Figure 11C:
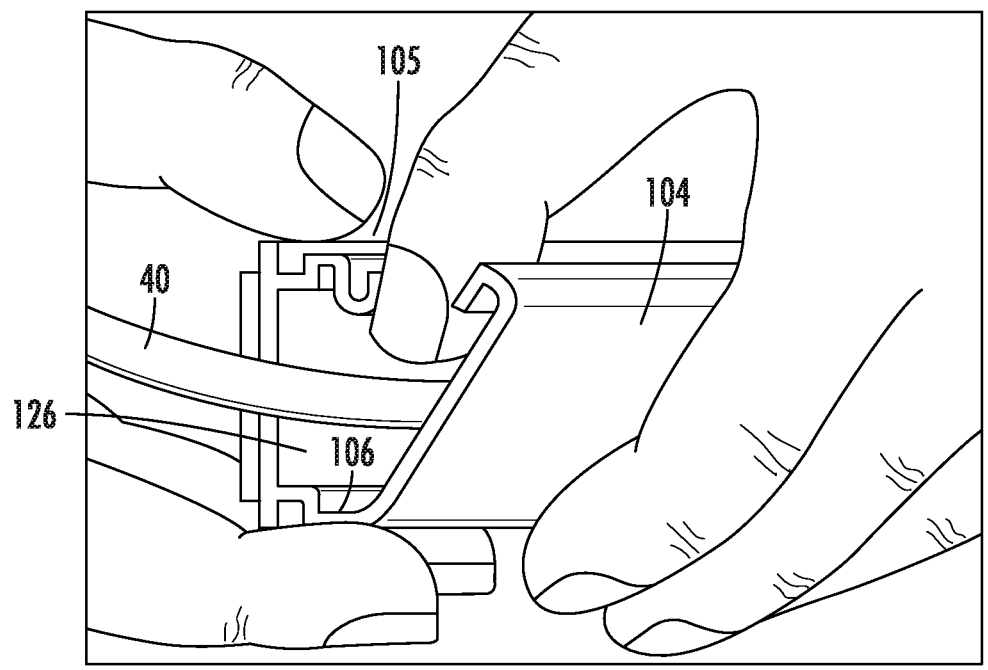
FIG. 11C is a schematic diagram during use of the wire management system of FIG. 10A in which the side wall is moved away from the front wall to open the wire management system.
Figure 11D:
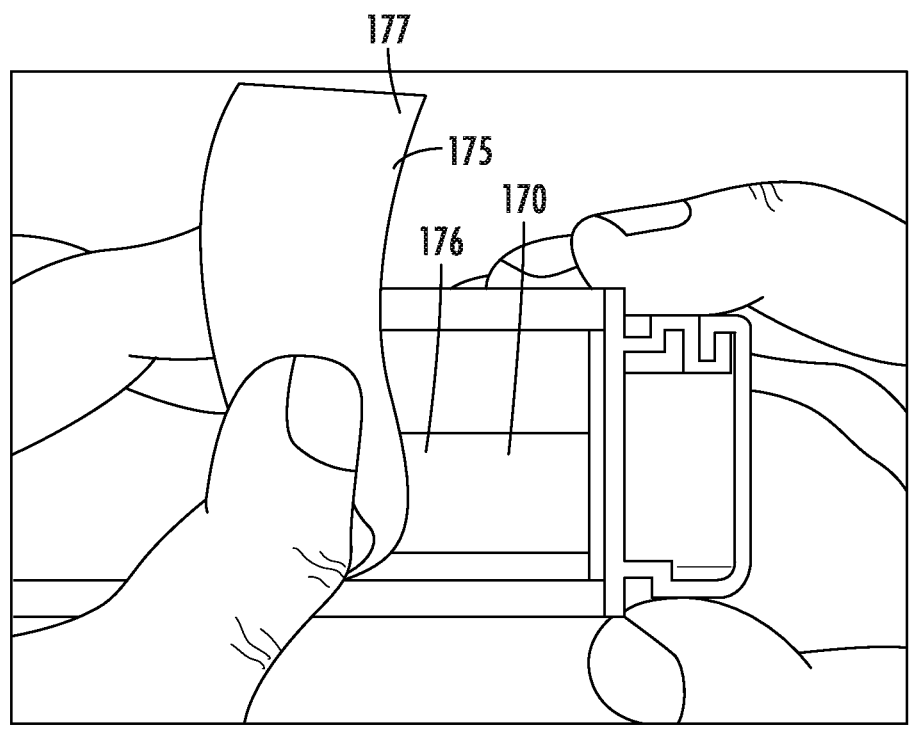
FIG. 11D is a schematic diagram during use of the wire management system of FIG. 10A in which a first portion of a release liner is removed from an adhesive strip.
Figure 11E:
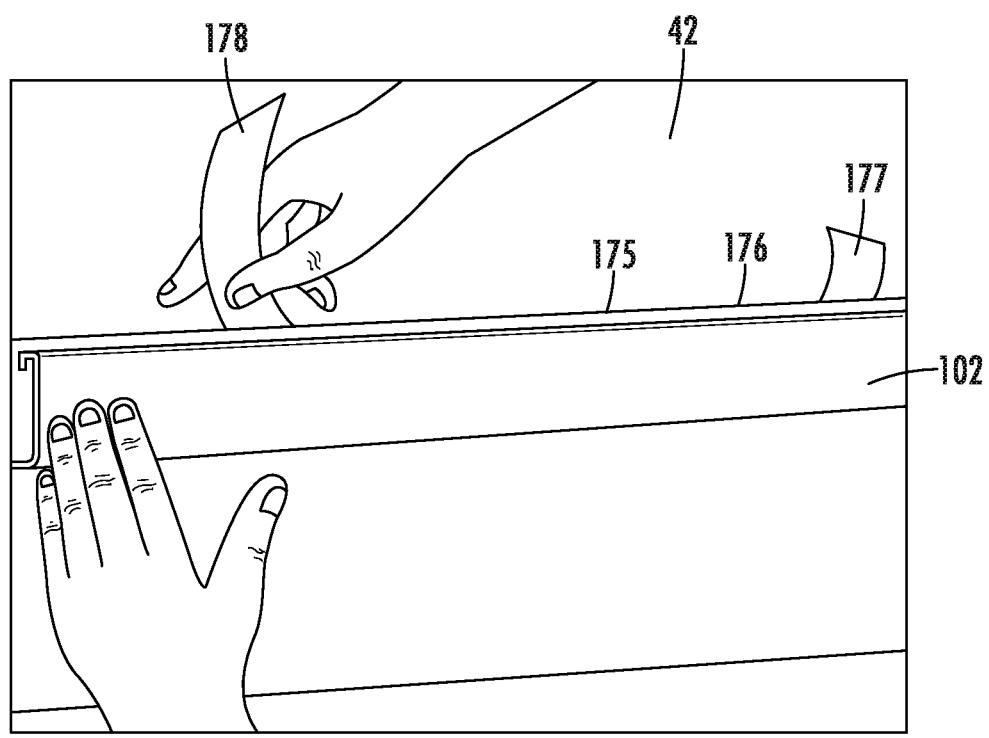
FIG. 11E is a schematic diagram during use of the wire management system of FIG. 10A in which a second portion of the release liner is released from the adhesive strip.

FIGS. 11A-11E illustrate operation of kit 101 of wire managements systems 100. A user can measure the amount of wire or cable to be covered to select a desired pre-determined length for the wire management systems as shown in FIG. 11A. Side wall 106 of cord cover 102 can be pushed by user 99 to release lip 121 of side wall 106 from lip 125 of front lid 104 to release side wall 106 from front wall 104 as shown in FIG. 11B. Cord 40 can be inserted into cavity 126 below front lid 104 between side wall 105 and side wall 106 as show in FIG. 11C. Front lid 104 can be snap closed before attaching cord cover 102 to retain cord 40 in cavity 126 as shown in FIG. 11D. Portion 177 of adhesive liner 175 can be folded back on an angle exposing side 176 of adhesive strip 170. Cord cover 102 can be placed in a correct position adjacent surface 42. Once in a correct position, portion 178 of adhesive liner 175 can be removed and side 176 can be pressed into position to contact surface 42.

Figure 12A:
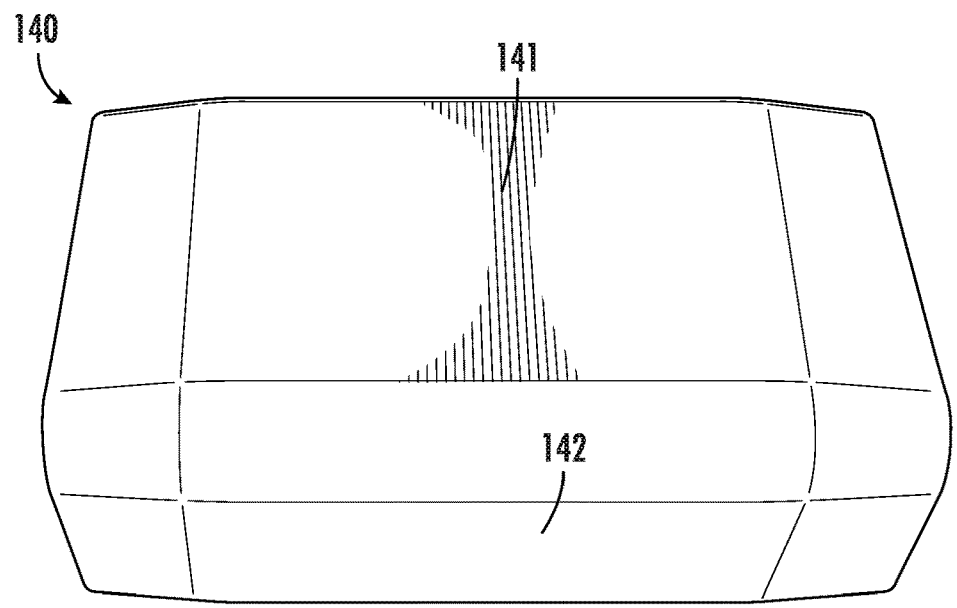
FIG. 12A is a top and side view of a connector which is used in the kit.
Figure 12B:
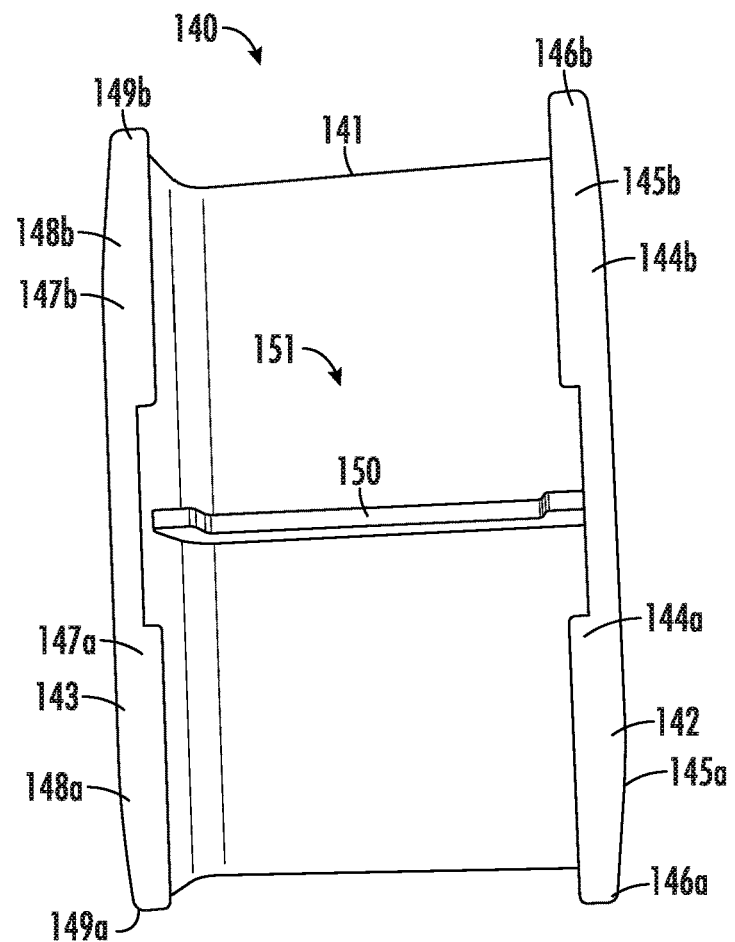
FIG. 12B is a bottom view of the connector shown in FIG. 12A.
Figure 12C:
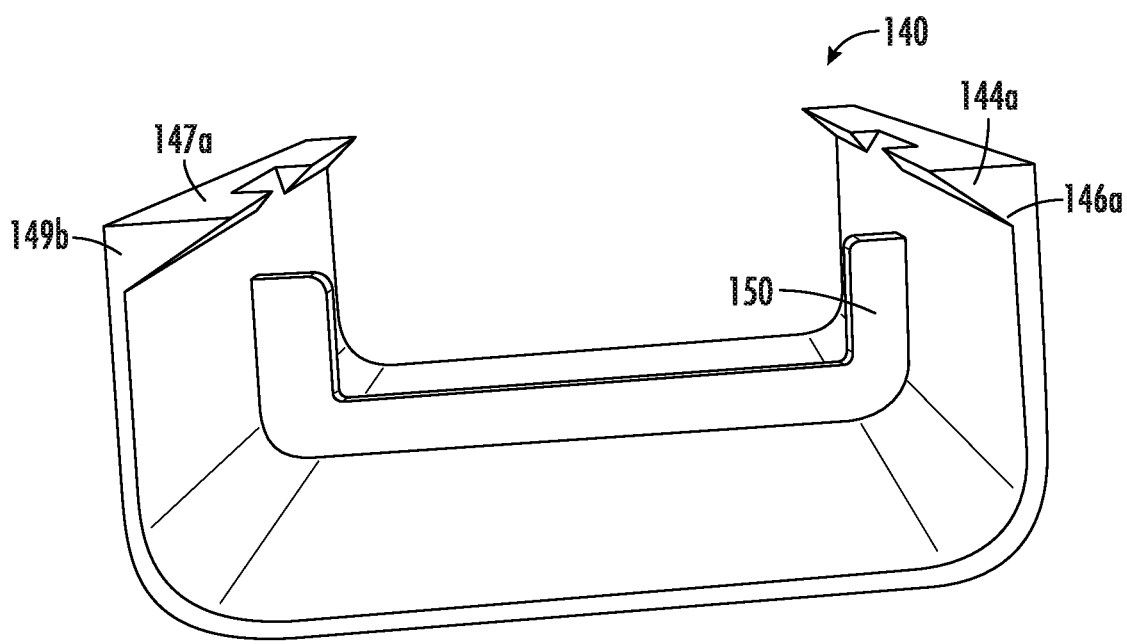
FIG. 12C is an end and bottom view of the connector shown in FIG. 12A.

Referring to FIG. 9, kit 101 can include one more connectors 140. Connector 140 can connect or cover adjacent cord covers 102a and 102b. Referring to FIGS. 12A-12C, connector 140 can include front wall 141 coupled or integral with side wall 142 and side wall 143. Rib 144a extends along portion 145a of side wall 142 from end 146a. Rib 144b extends along a portion 145b of side wall 142 from end 146b. Rib 147a extends along portion 148a of side wall 143 from end 149a. Rib 147b extends along portion 148b of side wall 143 from end 149b. Stop rib 150 can be formed on bottom surface 151 of front wall 141. Stop rib 150 extends laterally between side wall 142 and side wall 143. Stop rib 150 can be positioned between portion 148a and portion 148b of side wall 142 and portion 149a and portion 149b of side wall 143. During use rib 144a can be received in indentation 132 of side wall 105 of cord cover 102a as shown in FIG. 9. Rib 147a can be received in indentation 136 of side wall 106 of cord cover 102a. Rib 144b can be received in indentation 132 of side wall 105 of cord cover 102b. Rib 147b can be received in indentation 136 of side wall 106 of cord cover 102b. Cord covers 102a and 102b can slide beneath connector 140 until each contacts stop rib 150.

Figure 13A:
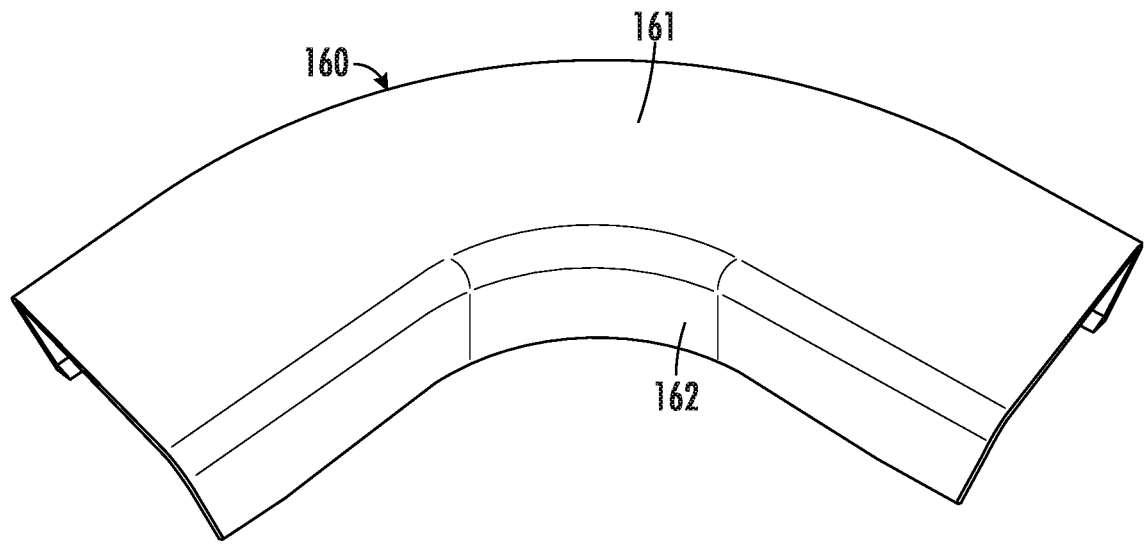
FIG. 13A is a top and side view of a curved connector which is used in the kit.
Figure 13B:
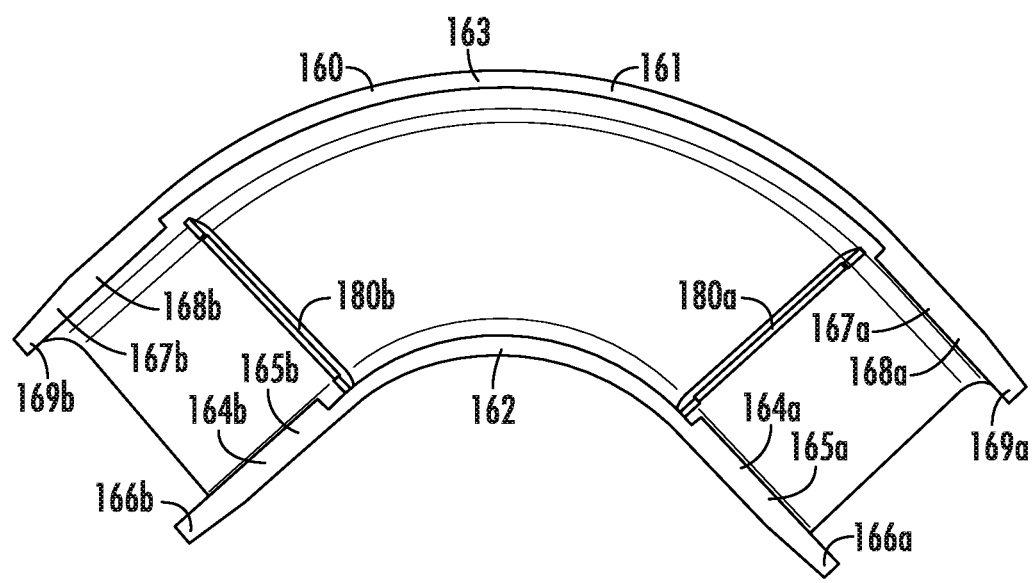
FIG. 13B is a bottom view of the curved connector shown in FIG. 13A.
Figure 13C:
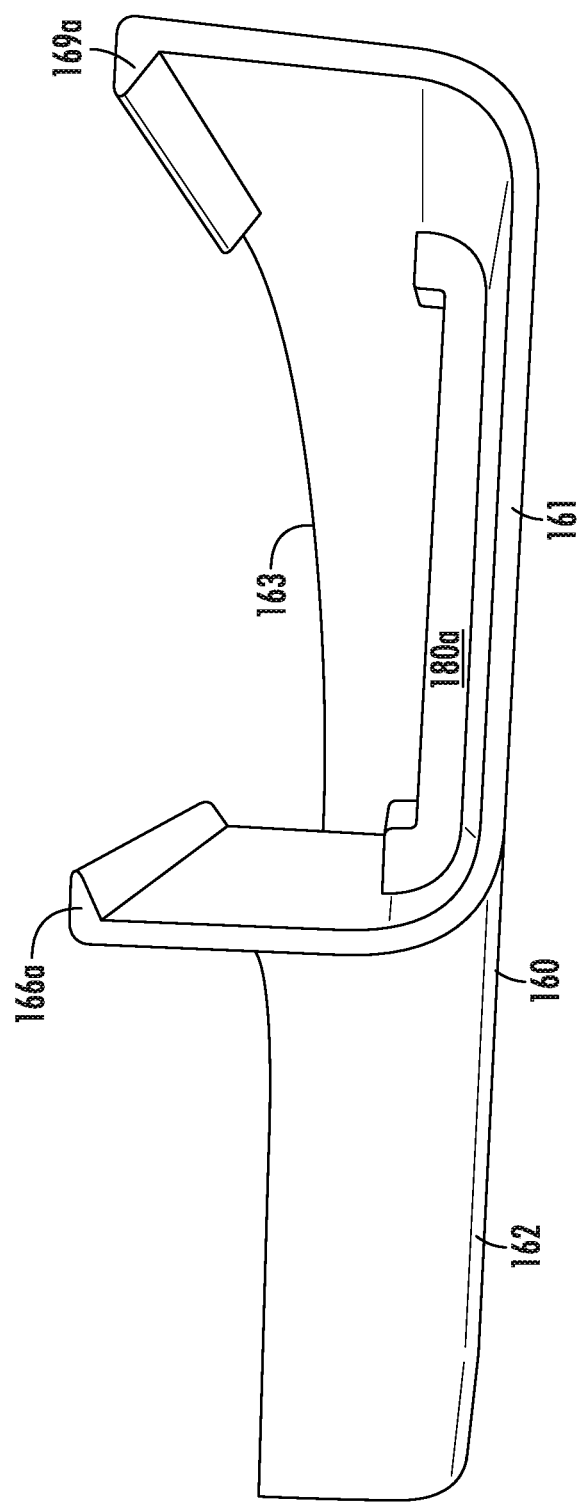
FIG. 13C is an end and bottom view of the curved connector shown in FIG. 13A.

Referring to FIG. 9, kit 101 can include one or more curved connectors 160. Curved connector 160 can connect or cover adjacent cord covers 102b and 102c. Referring to FIGS. 13A-13C, curved connector 160 can include front wall 161 coupled or integral with inner side wall 162 and outer side wall 163. Front wall 161, inner side wall 162 and outer side wall 163 can have a curved shape. The length of inner side wall 162 can be smaller than the length of outer side wall 163. Rib 164a extends along portion 165a of inner side wall 162 from end 166a. Rib 164b extends along a portion 165b of inner side wall 162 from end 166b. Rib 167a extends along portion 168a of outer side wall 163 from end 169a. Rib 167b extends along portion 168b of outer side wall 163 from end 169b. Stop ribs 180a, 180b can be formed on bottom surface 181 of front wall 181. Stop ribs 180a, 180b extends laterally between inner side wall 162 and outer side wall 163. Stop rib 180a can be positioned at an end of portion 165a of inner side wall 162 and end of portion 168a of outer side wall 163. Stop rib 180b can be positioned at an end of portion 165b of inner side wall 162 and an end of portion 168b of outer side wall 163. During use rib 164a can be received in indentation 136 of side wall 106 of cord cover 102b. Rib 164b can be received in indentation 136 of side wall 106 of cord cover 102c. Rib 167a can be received in indentation 132 of side wall 105 of cord cover 102c. Rib 167b can be received in indentation 132 of side wall 105 of cord cover 102b. Cord cover 102b can slide beneath curved connector 160 an end of cord cover 102b contacts stop rib 180a. Cord cover 102c can slide beneath curved connector 160 until an end of cord cover 102c contacts stop rib 180b. Curved connector 160 can be used with cord covers 102 which are attached in different directions such as a vertical and a horizontal direction.

Figure 14A:
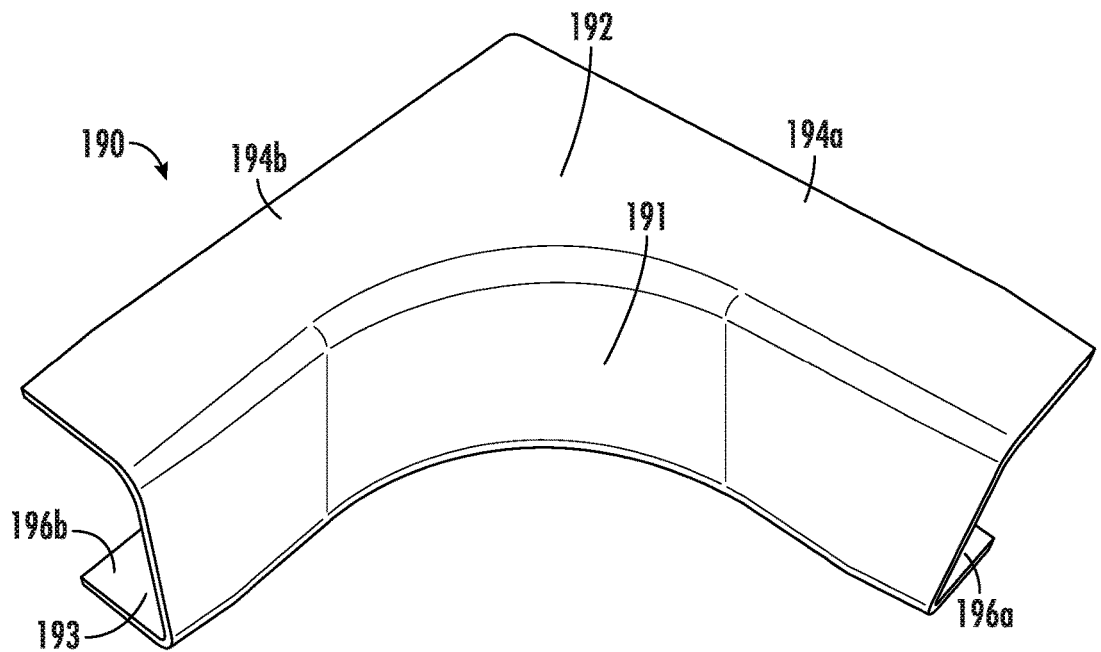
FIG. 14A is a top and side view of an angled connector which is used in the kit.
Figure 14B:
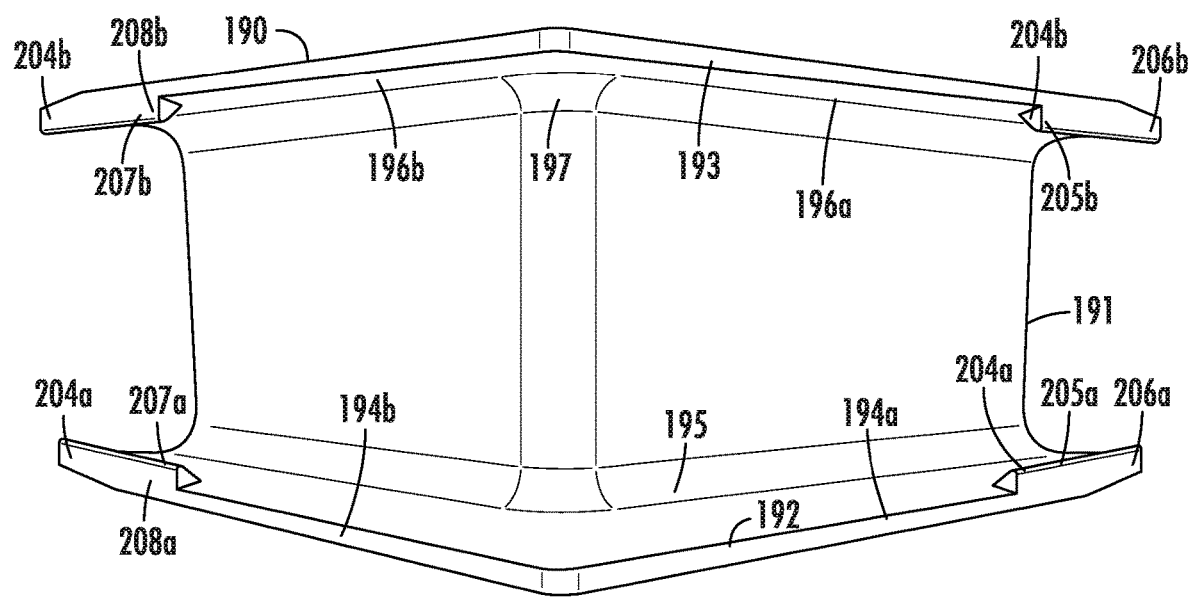
FIG. 14B is a bottom view of the angled connector shown in FIG. 14A.
Figure 15A:
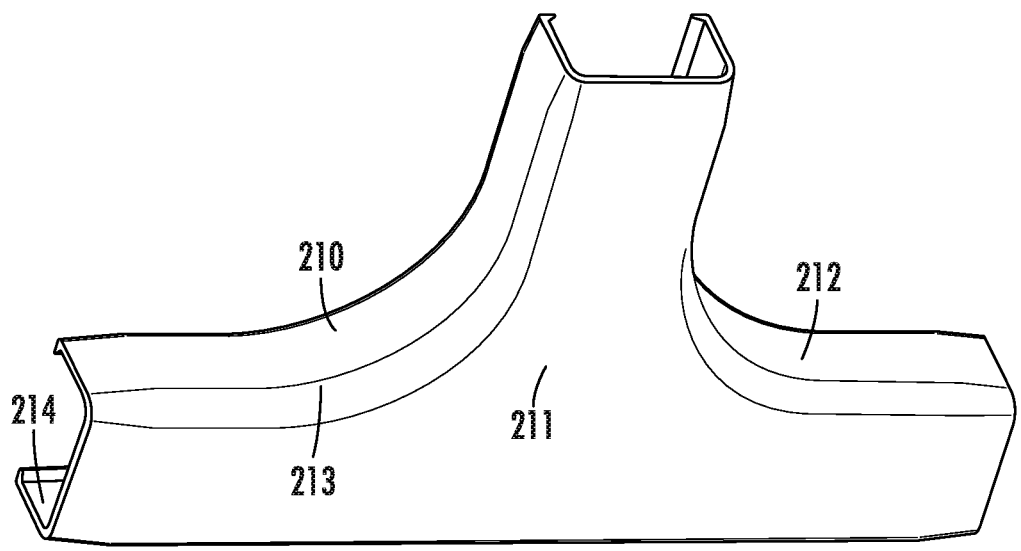
FIG. 15A is a top and side view of an T connector which is used in the kit.
Figure 15B:
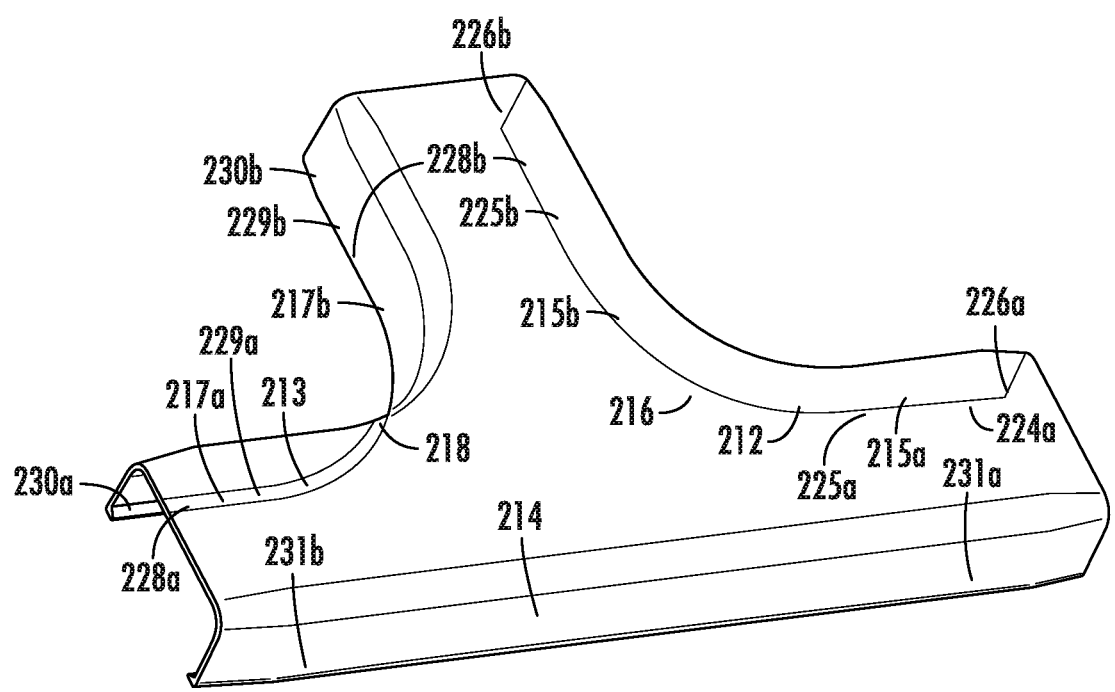
FIG. 15B is a bottom view of the T connector shown in FIG. 15A.

Referring to FIG. 9, kit 101 can include one or more angled connectors 190. Angled connector 190 can connect or cover adjacent cord covers 102d and 102e which are adjacent to corner 43. Referring to FIGS. 14A-14B, angled connector 190 can include front wall 191 coupled or integral with side wall 192 and side wall 193. Front wall 191 can have a curved shape. Side wall 192 can be formed of first outer edge 194a and second outer edge 194b. First outer edge 194a can be perpendicular to second outer edge 194b. Inner edge 195 of side wall 192 can have a curved shape to match the curved shape of front wall 191. Side wall 193 can be formed of first outer edge 196a and second outer edge 196b. First outer edge 196a can be perpendicular to second outer edge 196b. Inner edge 197 of side wall 193 can have a curved shape to match the curved shape of front wall 191. Rib 204a extends along portion 205a of side wall 192 from end 206a. Rib 204b extends along a portion 205b of side wall 192 from end 206b. Rib 207a extends along portion 208a of side wall 193 from end 209a. Rib 207b extends along portion 208b of side wall 193 from end 209b. During use rib 204a can be received in indentation 132 of side wall 105 of cord cover 102d. Rib 207a can be received in indentation 136 of side wall 106 of cord cover 102d. Rib 204b can be received in indentation 132 of side wall 105 of cord cover 102e. Rib 207b can be received in indentation 136 of side wall 106 of cord cover 102e. Cord cover 102d and cord cover 102e can slide beneath angled connector 190. Angled connector 190 can be used with cord connectors 102 which are positioned in different directions adjacent a corner.

Referring to FIG. 9, kit 101 can include one or more T shaped connectors 210. T shaped connector 210 can connect or cover adjacent cord covers 102c, 102d and 102f. T shaped connector 210 can include front wall 211 coupled or integral with inner side wall 212, inner side wall 213 and outer side wall 214. Front wall 211 can have a T shape. In one embodiment, edges of the T shape are curved. Inner side wall 212 can be formed of first edge 215a and second edge 215b. First edge 215a can be perpendicular to second edge 215b. First edge 215a and second edge 215b can connected with curved center edge 216. Inner side wall 213 can be formed of first edge 217a and second edge 217b. First edge 217a can be perpendicular to second edge 217b. First edge 217a and second edge 217b can connected with curved center edge 218. Outer side wall 214 can be parallel to first edge 215a and first edge 217a. Inner side wall 212 and inner side wall 213 can have a curved shape to match either side of the curved T shape of front wall 211. Rib 224a extends along portion 225a of inner side wall 212 from end 226a. Rib 224b extends along a portion 225b of inner side wall 212 from end 226b. Rib 228a extends along portion 229a of inner side wall 213 from end 230a. Rib 228b extends along portion 229b of inner side wall 213 from end 230b. Ribs 231a and 231b extends along outer side wall 214. During use rib 224a can be received in indentation 132 of side wall 105 of cord cover 102c. Rib 207a can be received in indentation 132 of side wall 106 of cord cover 102d. Rib 204b can be received in indentation 132 of side wall 105 of cord cover 102f. Rib 207b can be received in indentation 136 of side wall 106 of cord cover 102e. Cord cover 102c, cord cover 102d and cord cover 102f can slide beneath T shaped connector 190. T shaped connector 190 can be used with cord connectors 102 which are positioned in different directions both vertical and horizontal.

FIG. 16 illustrates example kit 400. Kit 400 includes a plurality of cord covers 102a-102c, connectors 140a-140e, curved connectors 160a, 160b, angled connector 170 and T shaped connector 210. Connectors 140a, 140b can have a first size and connectors 140c-140e can have a second size. It will be appreciated that various kits can be formed from one or more of the components described herein.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed:

1. A wire management kit comprising:
a plurality of cord covers packaged to form the wire management kit;
each of the cord covers having a front lid, first side wall, second side wall and rear wall;
the first side wall and the second side wall extending from the rear wall;
the front lid having one end coupled or integral with the first side wall;
a cavity formed between the first side wall, the second side wall and the rear wall;
the front lid removably engaging the second side wall;
wherein each of the cord covers is configured for receiving one or more cords by flexing the second side wall to release the front lid to insert the cord into the cavity and each of the cord covers having a predetermined length, the predetermined length of at least one of the cord covers being different than the predetermined length of at least another of the cord covers and wherein the various predetermined lengths being configured to cover corresponding various arrangements of the one or more cords.

2. The kit of claim 1 wherein the front lid includes a first flange at an outer end and the second side wall includes a second flange at an outer end.

3. The kit of claim 2 wherein the first flange includes a first lip and the second flange includes a second lip, the first lip engaging the second lip for engaging the front lid to the second side wall to close the cord cover.

4. The kit of claim 1 wherein the front lid and the second side wall are formed of a flexible material.

5. The kit of claim 4 wherein the flexible material is formed of flexible polyvinyl chloride (PVC) or urethane.

6. The kit of claim 4 wherein the rear wall is formed of a rigid or semi-rigid material.

7. The kit of claim 6 wherein the front lid, side walls and rear wall are co-extruded.

8. The kit of claim 1 wherein the cord cover is formed of a material selected from plastic, high density and low-density polyethylene, polyvinyl chloride (PVC), acrylonitrile butadiene styrene (ABS) or nylon.

9. The kit of claim 1 wherein a first side of an adhesive material or pressure sensitive adhesive strip is attached or coated on an outer surface of the rear wall of each of the cord covers and an adhesive liner is removably attached to a second side of the pressure sensitive adhesive strip.

10. The kit of claim 1 further comprising a connector, the connector configured for connecting a first cord cover to a second cord cover.

11. A plurality of cord covers;
each of the cord covers having a front lid, first side wall, second side wall and rear wall;
the first side wall and the second side wall extending from the rear wall;
the front lid having one end coupled or integral with the first side wall;
a cavity formed between the first side wall, the second side wall and the rear wall;
the front lid removably engaging the second side wall; and
a connector, the connector configured for connecting a first cord cover to a second cord cover,
wherein each of the cord covers is configured for receiving one or more cords by flexing the second side wall to release the front lid to insert the cord into the cavity and each of the cord covers having a predetermined length and
wherein the connector comprises a front wall coupled or integral with a first side wall and a second side wall, a first rib extends along a portion of the first side wall from a first end, a second rib extends along a portion of the first side wall from a second end, a third rib extends along a portion of the second side wall from a first end and a fourth rib extends along portion of the second side wall from second end, a stop rib formed on a bottom surface of the front wall, the stop rib extends laterally between the first side wall the second side wall, the first and second ribs being received in an indentation in the first and second side wall of a first cord cover and the third and fourth ribs being received in an indentation in the first and second side wall of a second cord cover.

12. The kit of claim 1 further comprising a curved connector, the curved connector configured for connecting a first cord cover to a second cord cover.

13. A plurality of cord covers;
each of the cord covers having a front lid, first side wall, second side wall and rear wall;
the first side wall and the second side wall extending from the rear wall;
the front lid having one end coupled or integral with the first side wall;
a cavity formed between the first side wall, the second side wall and the rear wall;
the front lid removably engaging the second side wall; and
a curved connector, the curved connector configured for connecting a first cord cover to a second cord cover,
wherein each of the cord covers is configured for receiving one or more cords by flexing the second side wall to release the front lid to insert the cord into the cavity and each of the cord covers having a predetermined length,
wherein the curved connector comprises a front wall coupled or integral with an inner side wall and an outer side wall, the inner side wall having a smaller length than the outer side wall, a first rib extends along a portion of the inner side wall from a first end, a second rib extends along a portion of the inner side wall from a second end, a third rib extends along a portion of the outer side wall from a first end and a fourth rib extends along portion of the outer side wall from second end, a stop rib formed on a bottom surface of the front wall, a first stop rib extends laterally between the inner side wall the outer side wall adjacent the first and second ribs, a second stop rib extends laterally between the inner side wall the outer side wall adjacent the third and fourth ribs, the first and second ribs being received in an indentation in the first and second side wall of a first cord cover and the third and fourth ribs being received in an indentation in the first and second side wall of a second cord cover.

14. The kit of claim 1 further comprising an angled connector, the angled connector configured for connecting a first cord cover to a second cord cover.

15. A plurality of cord covers;
each of the cord covers having a front lid, first side wall, second side wall and rear wall;
the first side wall and the second side wall extending from the rear wall;

the front lid having one end coupled or integral with the first side wall;

a cavity formed between the first side wall, the second side wall and the rear wall;

the front lid removably engaging the second side wall; and an angled connector, the angled connector configured for connecting a first cord cover to a second cord cover, wherein each of the cord covers is configured for receiving one or more cords by flexing the second side wall to release the front lid to insert the cord into the cavity and each of the cord covers having a predetermined length, wherein the angled connector front wall coupled or integral with first side wall and second side wall, the first side wall having a first outer edge and a second outer edge, the first outer edge being perpendicular to the second outer edge, the second side wall having a first outer edge and a second outer edge, the first outer edge of the second side wall being perpendicular to the second outer edge of the second side wall, a first rib extends along a portion of the first outer edge of the first side wall a second rib extends along a porting of the second outer edge of the first side wall, a third rib extends along a portion of a first outer edge of the second side wall and a fourth rib extends along a portion of a second outer edge of the second side wall, the first and second ribs being received in an indentation in the first and second side wall of a first cord cover and the third and fourth ribs being received in an indentation in the first and second side wall of a second cord cover.

16. The kit of claim 1 further comprising an T shaped connector, the T shaped connector configured for connecting a first cord cover, a second cord cover and a third cord cover.

17. A plurality of cord covers;

each of the cord covers having a front lid, first side wall, second side wall and rear wall;

the first side wall and the second side wall extending from the rear wall;

the front lid having one end coupled or integral with the first side wall;

a cavity formed between the first side wall, the second side wall and the rear wall;

the front lid removably engaging the second side wall; and a T shaped connector, the T shaped connector configured for connecting a first cord cover, a second cord cover and a third cord cover, wherein each of the cord covers is configured for receiving one or more cords by flexing the second side wall to release the front lid to insert the cord into the cavity and each of the cord covers having a predetermined length, wherein the T shaped connector comprising a front wall coupled or integral with a first inner side wall, a second inner side wall and an outer side wall, the front wall having a T shape, the first and second inner side walls having a first edge and a second edge, the first edge being perpendicular to the second edge, the first edge and the second edge being connected with a curved center edge, the outer side wall being parallel to the first edge of the first and second inner side walls, a first rib extends along a portion of the first inner side wall, a second rib extends along the first inner side wall a second end, a third rib extends along portion a porting of the second inner side wall from a first end, a fourth rib extends along portion of second inner side wall, a fifth rib extends along the outer side wall from a first end and a sixth rib extends from the outer side wall from a second end, the first and second ribs being received in an indentation in the first and second side wall of the first cord cover and the third and fourth ribs being received in an indentation in the first and second side wall of the second cord cover, the fifth and sixth ribs being received in an indentation in the first and second side wall of the third cord cover.

* * * * *